G. S. WYATT & C. R. FARMER.
WIRELESS CHECK ROW ATTACHMENT FOR ROTARY-DROP CORN PLANTERS.
APPLICATION FILED APR. 7, 1914.
1,140,556.
Patented May 25, 1915.
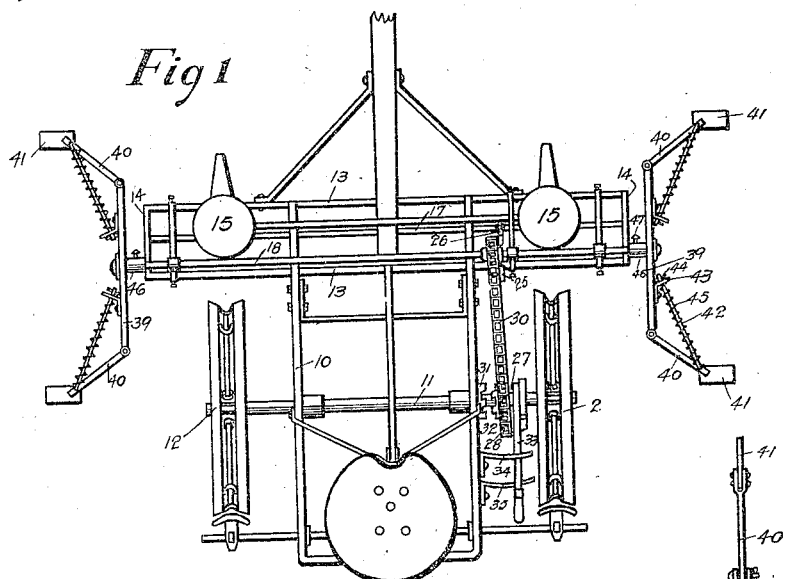
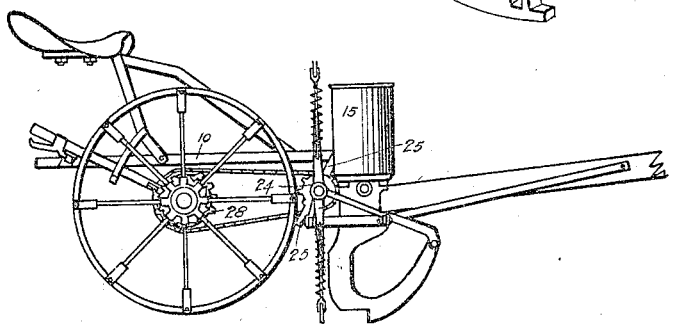
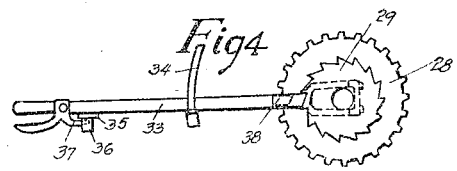
Inventors
George S. Wyatt and
Clarence R. Farmer

UNITED STATES PATENT OFFICE.

GEORGE S. WYATT AND CLARENCE R. FARMER, OF ALBIA, IOWA.

WIRELESS CHECK-ROW ATTACHMENT FOR ROTARY DROP CORN-PLANTERS.

1,140,556. Specification of Letters Patent. Patented May 25, 1915.

Application filed April 7, 1914. Serial No. 830,297.

*To all whom it may concern:*

Be it known that we, GEORGE S. WYATT and CLARENCE R. FARMER, citizens of the United States, and residents of Albia, in the county of Monroe and State of Iowa, have invented a certain new and useful Wireless Check-Row Attachment for Rotary Drop Corn-Planters, of which the following is a specification.

The object of our invention is to provide a wireless check row attachment for rotary drop corn planters of simple, durable and inexpensive construction.

More particularly, it is our object to provide such a device, so constructed and arranged that it may be readily and easily attached to or removed from corn planters of ordinary construction now in common use.

Still a further object is to provide such a device including a transverse shaft, and a gearing device for operatively connecting said shaft with the axle of the planter so that the shaft may be rotated from the axle, which gearing device includes means for disconnecting the shaft from the axle and also means for manually rotating the shaft forwardly independent of the movement of the axle.

Still a further object is to provide simple and effective marking devices mounted on said shaft.

Our invention consists in certain details, in the construction, combination and arrangement of the various parts of the device, whereby the objects contemplated are attained, as hereinafter more fully set forth, pointed out in our claims, and illustrated in the accompanying drawings, in which:

Figure 1 shows a top or plan view of the corn planter equipped with an attachment embodying our invention. Fig. 2 shows a side elevation of the same. Fig. 3 shows a side elevation of the marker device taken from the planter side. Fig. 4 shows a detail view of the ratchet controlling lever. Fig. 5 shows a side elevation of one of the brackets, the members of the planter frame being shown in section, and Fig. 6 shows a detail view of the sprocket on the additional shaft, and the dropper fingers on the marker shaft. Fig. 7 shows a detail perspective view of one of the lever supporting brackets.

In the accompanying drawings we have used the reference numeral 10 to indicate generally the frame of a corn planter of ordinary construction. The machine has an axle 11 on which are fixed the wheels 12.

On the forward portion of the frame is the additional frame comprising the transverse members 13 spaced from each other and the short, longitudinal connecting members 14, for connecting the members 13 at their ends.

Mounted on the second frame just described are ordinary rotary drop planter boxes 15, containing planter mechanism not shown, which planter mechanism is operated from the transverse shaft 17, which we will call the dropper shaft.

Our improved attachment includes a transverse shaft 18, which is mounted on the secondary frame above mentioned, in the following manner.

We provide special brackets for mounting the shaft 18 on the frame members 13. The brackets each comprise an arm 19 extending from the forward member 13 upwardly and rearwardly and an arm 20, extending forwardly and upwardly from the rearward member 13. Each of the arms 20 and 19 is provided with a bifurcated lower end 21, between the parts of which are received the respective members 13. The bifurcated ends 21 of the arms 19 and 20 are detachably secured to the members 13 by means of set screws 22, extended through one of the members of said bifurcated arms. The arms 20 and 19 are formed integral with each other at their upper ends and formed on said arms at their points of juncture are bearings 23 in which the shaft 18 is rotatably mounted.

Mounted on the shaft 18 is a sprocket gear 24. The sprocket gear 24 is provided with lugs or fingers 25, designed to engage fingers or lugs 26 on the shaft 17, for operating said dropper shaft 17.

Mounted on the axle 11 is a sleeve 27. Formed on one end of the sleeve 27 is a sprocket gear 28 and formed on the other end thereof is a ratchet wheel 29. The sleeve 27 is rotatably and slidably mounted on the shaft 11.

A chain 30 travels on the sprocket wheels 28 and 24.

Fixed on the shaft 11, adjacent to the sprocket 28 is a clutch member 31, designed to coact with a clutch member 32 formed on the adjacent side of said sprocket 28.

For sliding the sleeve 27 on the shaft 11 and thereby throwing the clutch members into or out of engagement with each other and also for coacting with the ratchet 29 and rotating the sleeve 27, we have provided the following means: A lever 33 is provided with a collar, at one end of which the sleeve 27 is rotatably mounted, as shown by the dotted lines in Fig. 4. The lever 33 extends rearwardly from the sleeve 27. The lever 33 is received at a point between its ends in a vertically elongated slot in the bracket 34. The bracket 34 permits movement of the lever 33 in a vertical plane and also permits pivotal movement thereof in a horizontal plane. Mounted on the frame, near the free end of the lever 33 is a bracket 35, on which is a lug 36, having a socket to receive a pawl 37 pivoted to the lever 33. The collar on the forward end of the lever 33 is elongated to permit longitudinal movement of the lever 33. Formed or mounted on the lever 33, near the ratchet 29, is a lug or engaging device 38, designed to engage the teeth of the ratchet 29 when the lever 33 is at the forward position of its sliding movement and to clear said teeth when said lever is at the rearward position of its movement. The lever is so constructed that when it is at the rearward position of its movement and is lowered, the point of the pawl 37 may be received in the slot in the lug 36 and the lever will thereby be held against forward sliding movement. We will hereinafter describe the practical operation of the lever 33 and the ratchet and clutch devices.

Mounted upon each end of the shaft 18 is a bar 39 and pivoted to each end of each bar 39 is an outwardly inclined arm 40. Mounted on the outer end of each arm 40 is a marker shovel 41. Pivoted to each arm 40 near its outer end is a rod 42 which is slidably mounted in a bracket 43 on the arm 39. A pin 44 in the rod 42 limits the outward movement of the arm 40 and an extensible spring 45 on each rod 42 holds the arm 40 at the outward limit of its movement. The bars 39 are secured to the shaft 18 by means of sleeves 46, fixed to the bars 39 and secured on the ends of the shaft 18 by means of set screws 47.

We will now describe the practical operation of our improved attachment. The device is installed on the machine by placing the brackets in position, mounting the shaft 18 and mounting the marker device thereon. The proper devices 26 are mounted on the shaft 17, the clutch member 31 is mounted on the shaft 11 and the gearing devices, including the lever 33 and the brackets 34 and 35 are suitably mounted. The boxes 15 then being filled with grain, the machine is in position for operation. The lever 33 is moved to position for throwing the clutch device in gear and the machine is drawn forward. The devices 25 successively engage the devices 26 and operate the shaft 17, thereby operating the dropping mechanism.

If, at any time, on account of inequalities in the ground or on account of the distance traveled in turning a corner, the marker devices should get out of line with the hills already planted, the machine can be stopped and the lever 33 moved to position for throwing the clutches out of gear and by sliding the lever forward longitudinally, the lug 38 can be made to engage the teeth of the ratchet 29 and by alternately raising and lowering the lever, the shaft 18 may be rotated any desired distance for bringing the marker devices to the proper position.

The advantages of a device of this kind are largely obvious from the foregoing description. The device is in the nature of an attachment and it could be readily placed on any machine so that its expense to the user of the machine is comparatively small. The attachment is of simple and durable construction and is simple and efficient in operation on account of the fact that both the clutch and the ratchet device are controlled by means of the single lever.

It will be understood that changes may be made in the details of the construction of our device, without departing from its essential features, and it is our intention to cover by this application any such changes in construction which may be included within the scope of the appended claims:

We claim as our invention:

1. In a device of the class described, a corn planter having a shaft for operating dropping mechanism and having an axle, a transverse shaft, means for rotatably mounting the same on said planter, marker devices on said transverse shaft, gearing devices on said transverse shaft and said axle, the gearing devices on the axle being rotatably and slidably mounted, means for operatively connecting said gearing devices including a lever having pivotal and sliding movements, a clutch device fixed on the axle, a clutch device formed on the gearing device on the axle, a sleeve formed on the gearing device on the axle, a ratchet wheel formed on said sleeve, the lever having on one end a collar with an elongated opening formed therein and receiving said sleeve, a lug on said lever designed in one position of the sliding movement of said lever to engage the teeth on said ratchet and in another position of said movement to clear said teeth, a bracket mounted on said planter, having an elongated slot, said lever being extended through said elongated slot, means for locking said lever in one position of its movement and means for intermittently transmitting motion from said transverse shaft to said first shaft.

2. In a device of the class described, a corn planter having a shaft for operating dropping mechanism and having an axle, a transverse shaft, means for intermittently transmitting motion from said transverse shaft to said first shaft, means for rotatably mounting the transverse shaft on said planter, marker devices on said transverse shaft, a gearing device on said transverse shaft, a gearing device slidably and rotatably mounted on said axle, means for operatively connecting said gearing devices, a clutch device fixed on the axle, a coacting clutch device formed on the gearing device on the axle, a ratchet operatively connected with the gearing device on said axle, means mounted on said axle for sliding the gearing device thereon and for coacting with said ratchet device for rotating said last named gearing device, said means comprising a lever slidably mounted on said axle to permit the rotation thereof, means for fulcruming said lever on said planter, a lug on said lever designed in one position of the sliding movement of the lever to engage the teeth of said ratchet, and means for locking said lever in one position of its movement.

Des Moines, Iowa, March 28, 1914.

GEORGE S. WYATT.
CLARENCE R. FARMER.

Witnesses:
W. T. PILKINGTON,
GEO. W. MILLER.